United States Patent
Bica et al.

(10) Patent No.: US 11,945,409 B2
(45) Date of Patent: Apr. 2, 2024

(54) SELF POWERED ROOF SYSTEM

(71) Applicant: MECHANEN Ltd., Markham (CA)

(72) Inventors: Adrian Bica, Markham (CA); Doru Serban, Richmond Hill (CA)

(73) Assignee: MECHANEN LTD., Markham (CA)

( * ) Notice: Subject to any disclaimer, the term of this patent is extended or adjusted under 35 U.S.C. 154(b) by 815 days.

(21) Appl. No.: 17/004,222

(22) Filed: Aug. 27, 2020

(65) Prior Publication Data
US 2021/0061181 A1    Mar. 4, 2021

(30) Foreign Application Priority Data
Aug. 30, 2019    (CA) .................. CA 3051890

(51) Int. Cl.
*B60R 9/042*     (2006.01)
*B60R 1/06*      (2006.01)
*B60R 13/04*     (2006.01)
*B60R 16/02*     (2006.01)
*B60R 16/023*    (2006.01)
*B60R 16/033*    (2006.01)
*H02J 7/00*      (2006.01)
*H02J 7/35*      (2006.01)

(52) U.S. Cl.
CPC ............ *B60R 9/042* (2013.01); *B60R 1/06* (2013.01); *B60R 13/04* (2013.01); *B60R 16/0207* (2013.01); *B60R 16/023* (2013.01); *B60R 16/033* (2013.01); *H02J 7/0042* (2013.01); *H02J 7/35* (2013.01)

(58) Field of Classification Search
CPC ................................... B60R 9/042
USPC ........................................ 224/310
See application file for complete search history.

(56) References Cited

U.S. PATENT DOCUMENTS

| 6,428,263 B1 * | 8/2002 | Schellens | B60R 9/042 |
| | | | 224/310 |
| 7,513,730 B2 | 4/2009 | Goyanko | |
| 7,758,091 B1 | 7/2010 | McCall | |
| 9,150,158 B2 * | 10/2015 | Reiber | B60R 9/055 |

(Continued)

FOREIGN PATENT DOCUMENTS

| AU | 2018223213 B2 * | 2/2023 | ............ B60R 9/042 |
| CA | 3051890 A1 * | 2/2021 | ............ B60R 1/06 |

(Continued)

*Primary Examiner* — Justin M Larson
(74) *Attorney, Agent, or Firm* — Craft Chu PLLC; Andrew W. Chu (57) ABSTRACT

The vehicle roof cargo carrying system includes front and rear subsystems affixed to the front and rear of the vehicle roof. Each subsystem includes an extrusion guide rail slidably engaging a sliding block. Each sliding block includes a translational actuator for side-to-side movement across the vehicle roof, and an elevation mechanism. The elevation mechanism includes a primary arm and secondary arm, wherein the primary arm first end pivotably attached to the sliding block and the primary arm second end hingeably attach to a first end of a secondary arm. A second end of the secondary arm is attached to a cargo-platform bracket. The primary and secondary arms are reversibly moveable from a folded position wherein the secondary arm is nested within the primary arm, and an unfolded position wherein the secondary arm extends from the primary arm. The primary arm pivots relative to the sliding blocks.

5 Claims, 5 Drawing Sheets

(56) References Cited

U.S. PATENT DOCUMENTS

| | | | |
|---|---|---|---|
| 9,290,130 B2* | 3/2016 | Buller | B60R 9/10 |
| 10,286,853 B1* | 5/2019 | Carbone | G05D 3/10 |
| 11,214,202 B2* | 1/2022 | Carbone | B60P 1/30 |
| 2014/0097219 A1* | 4/2014 | Reiber | B60R 9/042 |
| | | | 224/310 |
| 2014/0205419 A1* | 7/2014 | Svaldi | B60R 9/04 |
| | | | 224/310 |
| 2019/0381944 A1* | 12/2019 | Ellenbogen | B60R 9/042 |
| 2021/0362658 A1* | 11/2021 | Carbone | B60P 1/003 |
| 2022/0355741 A1* | 11/2022 | Yun | F16H 1/14 |

FOREIGN PATENT DOCUMENTS

| | | | | |
|---|---|---|---|---|
| CA | 3051890 C | * | 10/2022 | B60R 1/06 |
| WO | WO-2010064233 A1 | * | 6/2010 | B60R 9/042 |

* cited by examiner

SELF POWERED ROOF SYSTEM

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a system for mounting utility payloads, such as a roof cargo box, onto the roof of a vehicle. In particular, a powered roof system for loading and unloading the payload is described.

2. Description of Related Art Including Information Disclosed Under 37 CFR 1.97 and 37 CFR 1.98

The system disclosed herein is a powered roof system meant to assist a user with loading utility payloads from a conveniently accessible elevation on either side of a vehicle to the roof, followed by securing the payload in a cruising position, and subsequently unloading the payload upon user request.

While the automotive industry has yet to establish clear requirements for powered roof systems, such devices can be associated with several desirable features. The powered roof system should:

1. Provide secure and reliable means to load/unload utility payloads in such a configuration where user can access the utility payload in an ergonomically advantageous position, avoiding any interferences or intrusions to the system.
2. Follow a predictable upfolding path of the utility payload from the user access configuration to the cruising configuration, and in reverse order for downfolding operation.
3. Provide means to securely latch the system in the cruising configuration while enacting sufficient retention stiffness in case of unpredictable vehicle incidents.
4. Limit the amplitude of wind-noise generated by turbulent flow around system components.
5. Maximize the functional life of the system to cater to the most dramatic usage.

Past attempts to provide a solution to the above-described features resulted in various lifting devices that proved to be difficult to implement, unreliable and often intrusive, since most previous lifting devices required roof penetration to connect the devices to the vehicle electric system.

DESCRIPTION OF THE PRIOR ART

This discussion is limited to previous published patent applications and similar publications most of which relate generally to roof structures attached to the top of a car or sport utility vehicle. The sole purpose of iterating these examples is to outline the features that differentiate the presented application from each of the previous ones.

U.S. Pat. No. 7,513,730 (Goyanko) discloses an attachable mechanized device for loading and unloading cargo onto and from the roof of a motor vehicle. The proposed solution comprises a set of pivoting arms that include slidable segments, all of which rotate around the attachment point situated to one side of the vehicle roof. Besides the high torque required by such solution, the rotating path of the structure results in an envelope that largely extends above and to the side of the vehicle. The present invention alleviates many of these factors resorting to an unfolding path oriented along the side of the vehicle rather than away from it. The functional envelope of the present invention does not require extra clearance above the roof of the vehicle.

U.S. Pat. No. 7,758,091 (McCall) discloses a collapsible ladder rack system for use on a pickup truck that utilizes housings, main arms, material arms, extension arms, and supporting braces. The housings are secured to the rails. The hinged main arms rise vertically and are locked into place by braces. The hinged material arms rise horizontally and lock into place with braces. The extension arms telescope out of two of the material arms and insert into the empty material arms and lock into place. While the McCall device discloses a folding roof rack, the device achieves its functionality folding in a flat manner in the cargo space of the truck. The system is fundamentally different that the present claim in both kinematic and scope.

Finally, U.S. Pat. No. 9,290,130 (Buller) discloses a method of loading a cargo load onto the roof of the vehicle and unloading it on the side of the vehicle, however, the method resorts to using a torqued structure that implicitly extends sideways to the vehicle body in addition to a rather bulky gear worm assembly that induces high specific structural loads.

In light of the prior art and the disclosed elements of the present invention, it is claimed that the present invention substantially diverges both in intended functionality and in the design of the components from any one of the prior art.

BRIEF SUMMARY OF THE INVENTION

In one embodiment, the invention is a vehicle roof cargo carrying system, the system comprising front and rear subsystems affixed to the front and rear of the vehicle roof. Each subsystem comprising an extrusion guide rail slidably engaging a sliding block. Each sliding block comprises a translational actuator for side-to-side movement across the vehicle roof, and an elevation mechanism. The elevation mechanism comprises a primary arm having first and second ends wherein the primary arm first end pivotably attached to the sliding block and the primary arm second end hingeably attached to a first end of a secondary arm. A second end of the secondary arm is attached to a cargo-platform bracket.

The primary and secondary arms are reversibly moveable from a folded position wherein the secondary arm is nested within the primary arm, and an unfolded position wherein the secondary arm extends from the primary arm. The primary arm pivots relative to the sliding blocks to permit the elevation mechanism to raise and lower the cargo-platform bracket without contacting a side of the vehicle.

DETAILED DESCRIPTION OF THE INVENTION

Figure 1:
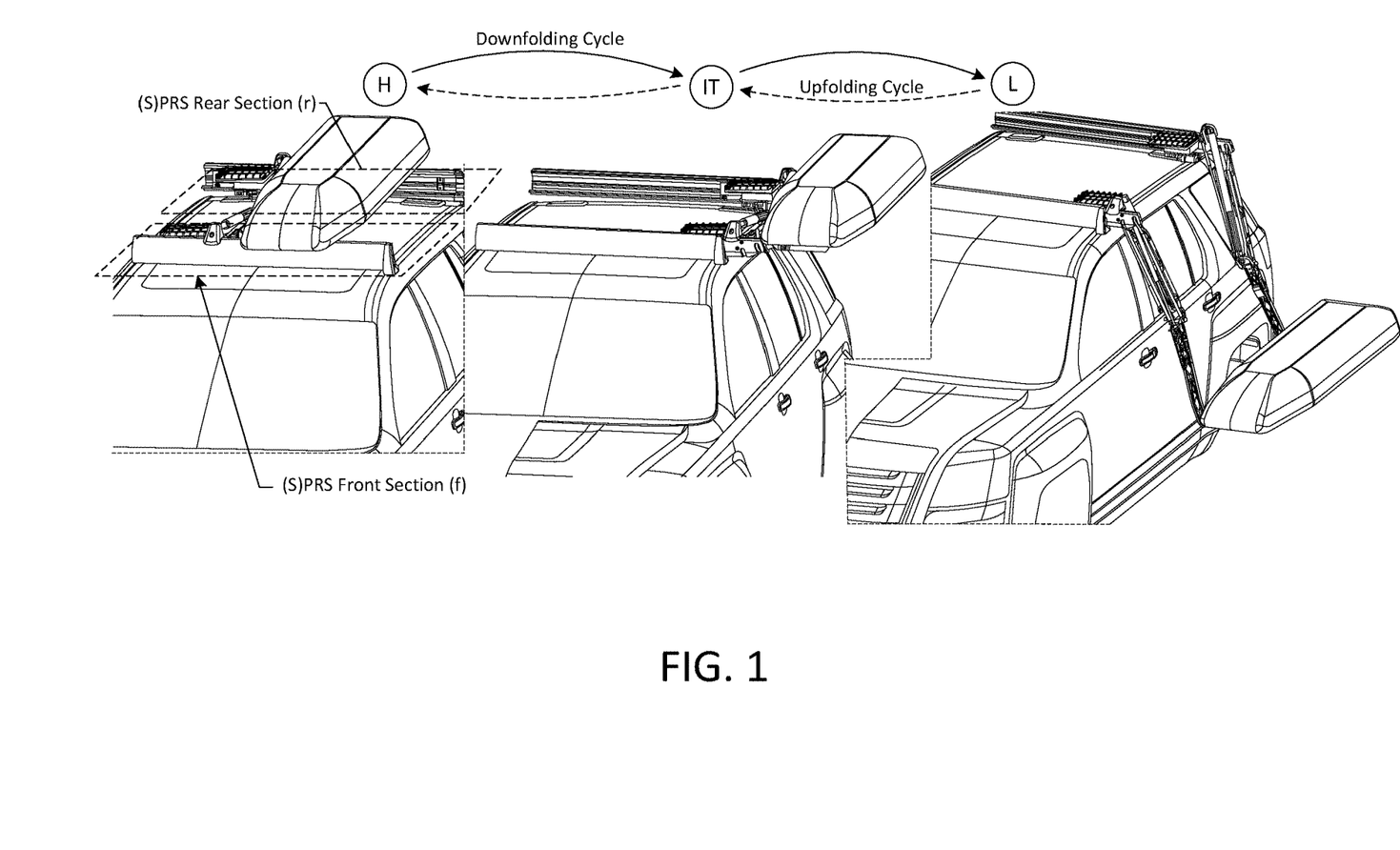
FIG. 1 shows perspective views, illustrating three configurations of the powered roof system.

In FIG. 1, the disclosed powered roof system (PRS), is shown attached to a vehicle (10). In the embodiment shown, a utility payload (110; in this example, a roof cargo box) is attached to a rigid cargo platform linking two symmetrical subsystems, denoted by (f) and (r) respectively, throughout the text. The PRS can be adapted so that any type of suitable utility payload may be attached.

Each subsystem is fitted with an elevation assembly [200(r) and 200(f)], which folds/unfolds to move the PRS through three configurations. Specifically, the PRS follows a downfolding/upfolding cycle in which the utility payload (110), is moved from a high cruising system configuration (H), to an intermediate transition configuration (IT), then to a low, utility-payload access system configuration (L). Thus the kinematic path partition illustrated in FIG. 1 includes separate actuation capabilities. Translational actuation (C/C) is responsible for transitioning the PRS between the H and IT configurations. Elevation actuation (U/D) is responsible for moving the utility payload between the IT and L configurations.

The PRS is secured in the H configuration during vehicular travel. In the L configuration, a user can access the cargo box at a level suitable for easy cargo loading/unloading. In the IT configuration, the elevation assembly (20) can be safely unfolded/folded in a manner that clears the vehicle body.

Figure 2:
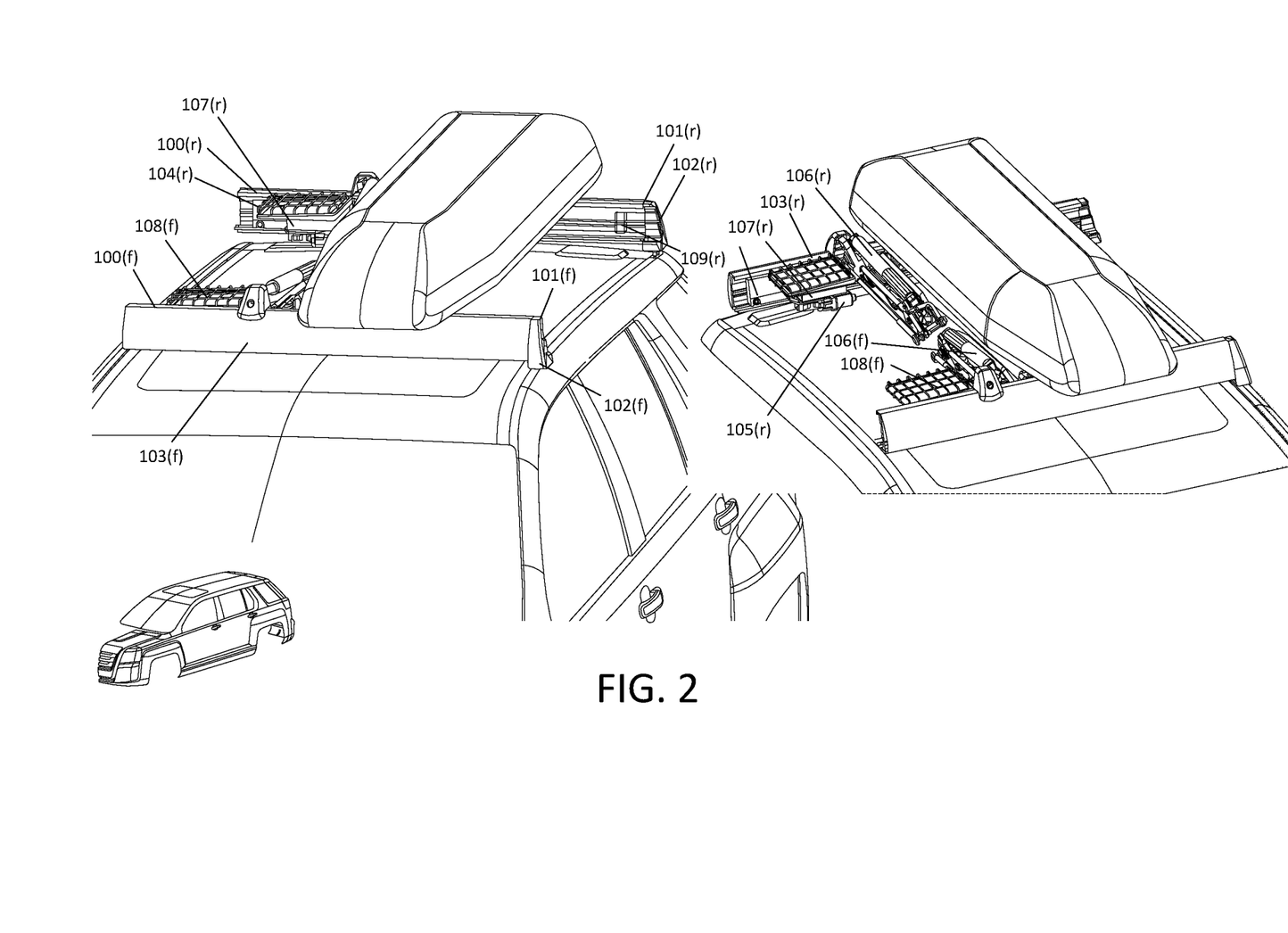
FIG. 2 is a perspective view of the powered roof system in the high cruising system configuration.

The PRS subsystems in the H configuration are shown in greater detail in FIG. 2. Extrusion guide rails [100(f) & 100(r)], positioned at the front and rear of the vehicle roof are attached thereto with end-brackets [101(f) & 101(r)] and corresponding fasteners (not shown). The end-brackets [101(f) & 101(r)] are optionally covered by beatifying covers [102(f) & 102(r)], for aesthetic appeal as well as to limit the penetration of dust, water and other potential contaminants.

A set of aerodynamic panels [103(f) & 103(r)], assembled on the front/rear of the extrusion guide rails [100(f) & 100(r)], may incorporate photo-voltaic panels in alternate embodiments. While docked in the H configuration, the photo-voltaic panels are electrically connected to a charging port for power packs [107(f) & 107(r)]. The aerodynamic panels [103(f) & 103(r)] are also instrumental in limiting wind noise while the vehicle is in motion.

Each of the extrusion guide rails [100(f) & 100(r)] accommodates a sliding block [104(f) & 104(r)], to which translational actuators [105(f) & 105(r)] and the elevation actuators [106(a) & 106(b)] attach. The sliding blocks [104(f) & 104(r)] are also attached to structured elevation assemblies [200(f) & 200(r)] and power packs [107(f) & 107(r)]. In alternate embodiments, solar recharging panels [108(f) & 108(r)] may also be attached to sliding blocks [104(f) & 104(r)].

The sliding blocks [104(f) & 104(r)] are guided inside the extrusion guide rails [100(f) and 100(r)] using guided bearings. The relative position of the sliding blocks [104(f) & 104(r)] inside the extrusion guide rails [100(f) and 100(r)] is controlled by the translational actuators [105(f) & 105(r)].

Figure 3:
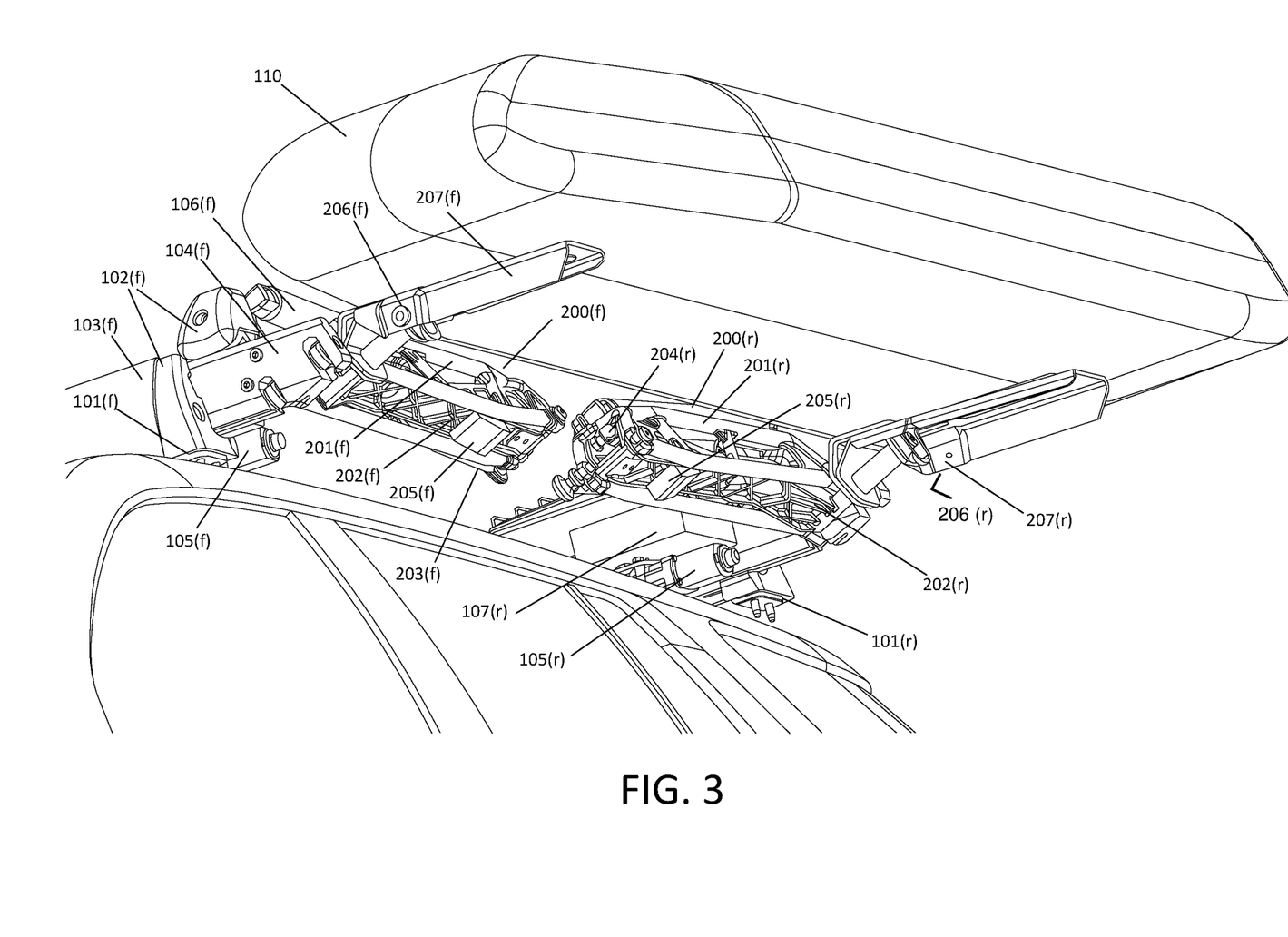
FIG. 3 is a perspective view of the powered roof system in the intermediate temporary configuration.
Figure 4:
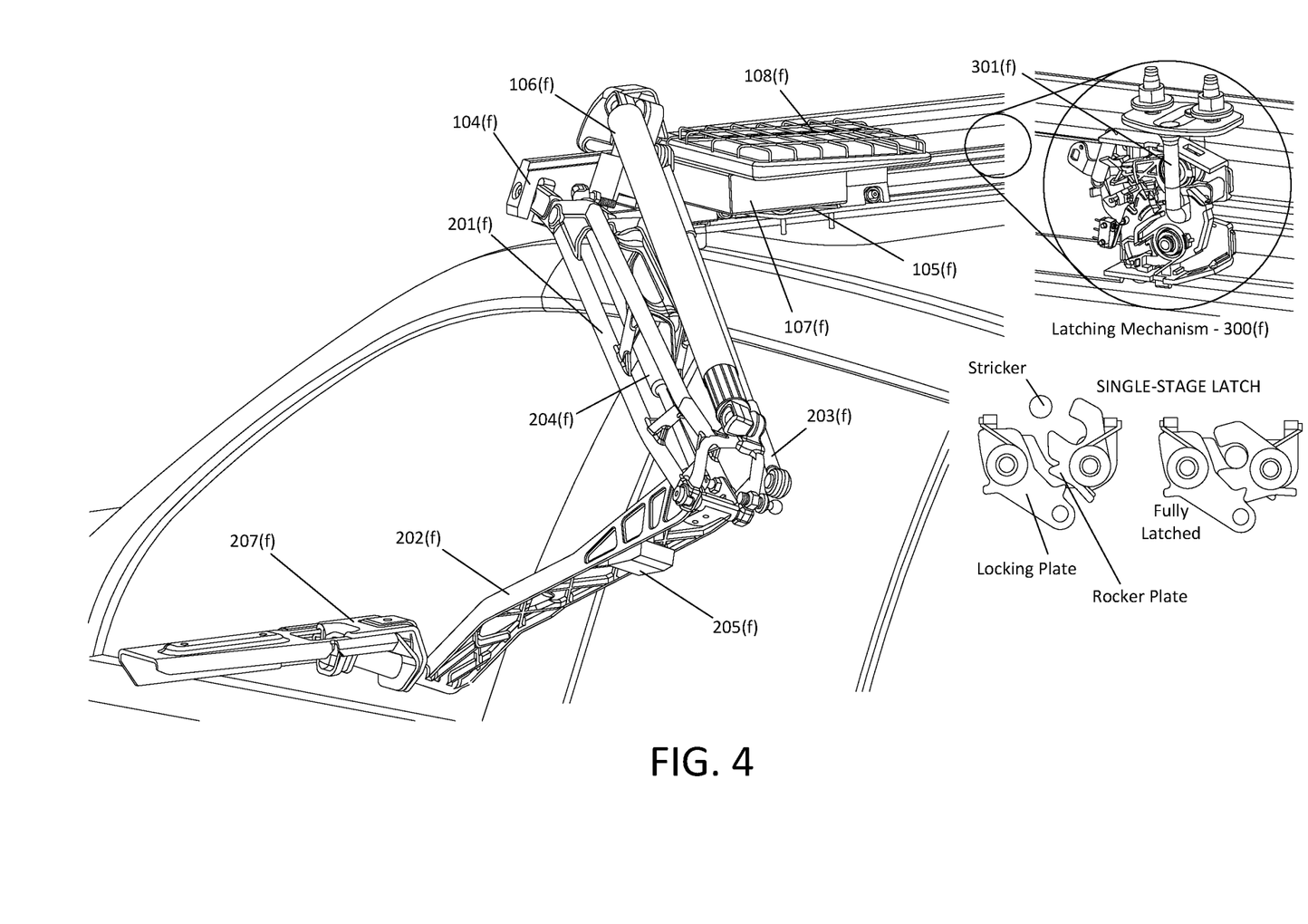
FIG. 4 is a perspective view of the elevation assembly and latching components of the powered roof system.

Each of the elevation mechanisms [200(f) and 200(r)], best seen in FIGS. 3 and 4, comprises a primary arm [201(f) & 201(r)], hinged at one end to the corresponding sliding block [104(f) & 104(r)], and articulated at the other end to a secondary arm [202(f) & 202(r)]. Primary arms [201(f) & 201(r)] pivot relative to the slider blocks [104(f) & 104(r)] in an angular orientation that allows unfolding of the primary arm [201(f) & 201(r)] in a manner that clears the side of the vehicle.

One end of each of the secondary arms [202(f) & 202(r)] articulates with the primary arms [201(f) & 201(r)] as described above. A second end of the secondary arms [202(f) & 202(r)] engages with cargo platform brackets [207(f) & 207(r)], with the same angular orientation thereby maintaining a constant orientation of the cargo platform relative to the vehicle body throughout the entire downfolding/upfolding cycle.

The pendulum tendency of the secondary arms [202(f) & 202(r)] is restricted via check-links [203(f) & 203(r)] that attach one end the check-links to the sliding blocks [104(f) & 104(r)] and the opposite end of the check-links to the secondary arms [202(f) & 202(r)]. Attachments to the sliding blocks [104(f) & 104(r)] are realized using a cantilever joint housed by a compliant bushing.

The kinematic relation established therefore between the sliding blocks [104(f) & 104(r)] and the secondary arms [202(f) & 202(r)] allows the PRS to ensure a vertical path of the cargo-platform throughout the downfolding/upfolding cycle of the PRS. A set of gas struts [204(f) & 204(r)] assist in providing uplifting force in the upfolding cycle, and locking force at the path end of the downfolding cycle. A set of locking blocks [205(f) & 205(r)] control the end position of arms when the elevation assemblies [200(f) & 200(r)] reach the end path in the upfolding cycle.

When in the H configuration, the structural stiffness of the assembly is greatly increased in the U/D direction by both the geometrical orientation of the front and rear sections rigidly connected by the cargo-platform, as well as by placing the two actuation systems in dynamic breaking configuration. This prevents the cargo-platform from sagging toward the vehicle roof or becoming displaced inside the extrusion guide rails. The sagging tendency of a highly loaded cargo-platform is further prevented by the two rollers [206(f) & 206(r)] guided using a channel housed in the extrusion guide rails. In the unfolded L configuration, the gas struts [204(f) & 204(r)] are pushing the secondary arms [202(f) & 202(r)] outward from the vehicle, increasing the stiffness of the elevation mechanism and preventing sideway movements of the cargo-platform in the process of loading/unloading.

Downfolding Cycle

Each downfolding cycle will start when a control unit commences the unlatching process, as triggered by the user. The latch & striker combination [FIG. 4: 300(*f*) & 300(*r*)] is disengaged, allowing the slider blocks [104(*f*) & 104(*r*)] to execute the (C/C) translational portion of the downfolding path. When the slider blocks [104(*f*) & 104(*r*)] reach the outermost position (see FIG. 1 for example), the slider blocks [104(*f*) & 104(*r*)] extend out of the extrusion guide rails [100(*f*) & 100(*r*)], at a distance appropriately chosen in such way that the (U/D) elevation assemblies [200(*f*) & 200(*r*)] can be safely deployed to lower the cargo platform (110) along the side of the vehicle.

Control modules are responsible for synchronizing the transition between the two actuation modes. Actuation of the sliding blocks [104(*f*) & 104(*r*)] and elevation assemblies [200(*f*) & 200(*r*)] is sequenced in a manner that prevents one actuation mode from starting before the second actuation mode is ended. The precise position of the two unfolding mechanisms is controlled by the check-links [203(*f*) & 203(*r*)], thereby avoiding any pendulum movement of the cargo-platform. Compensation between the trigonometric path of the sliding block attachment end and the linear attachment of the secondary elevation arms [202(*f*) & 202(*r*)] is achieved using the pivoting joint housed in a compliant bushing.

The gas struts cylinders [204(*f*) & 204(*r*)] enact a kinematic configuration that provides robust assistance to the elevating mechanism in order to reach the height of the IT configuration and to stiffen the L configuration as previously described.

Upfolding Cycle

Triggered by a user request, each upfolding cycle starts when the elevation mechanism is powered in a folding direction where the secondary elevation arms [202(*f*) & 202(*r*)] fold into the primary elevation arms [202(*f*) & 202(*r*)], thereby causing the cargo-platform to rise. Upon reaching the IT configuration, elevation actuation is stopped and the translational actuation is synchronously started, moving the sliding blocks [104(*f*) & 104(*r*)] toward the H configuration. As the sliding blocks [104(*f*) & 104(*r*)] enter the extrusion guide rails [100(*f*) & 100(*r*)], the rollers [206(*f*) & 206(*r*)] engage with guiding channels disposed on the inner face of the extrusion guide rails [100(*f*) & 100(*r*)]. Just before reaching the final H configuration, a striker rod hits the toggling rocker plate of the latching mechanism, thereby locking the sliding blocks [104(*f*) & 104(*r*) into the H configuration.

The system will retain this configuration until the user initiates a downfolding cycle at which time the previously described downfolding sequence repeats itself.

Secure operation of the PRS throughout the downfolding/upfolding cycle is ensured by two IR (infrared) or ultrasonic sensors placed on the exposed end of the sliding blocks [104(*f*) & 104(*r*)]. In other embodiments these sensors may be placed on the elevation assemblies [200(*f*) & 200(*r*)].

In addition, these sensors could be used in alternative embodiments to implement a haptic/gesture enabled HI (human interface). That way, the user has the option to stop or trigger a downfolding/upfolding cycle, and is able to drive the cargo-platform at an elevation of his/her choice.

The PRS can be completed in alternative embodiments by a CAN (communication area network, the most common communication network in vehicles) to Bluetooth communication module connected to a vehicle CAN connector and establishing a communication link with the PRS. This module would interpret adequate framed messages and prevent the PRS from downfolding in cases where side doors are accidentally opened during an active cycle, or in cases where the vehicle is not in engine-shut mode. In other embodiments, the same module could command side mirror folding ahead of a downfolding cycle.

Deployment Angle

Figure 5:
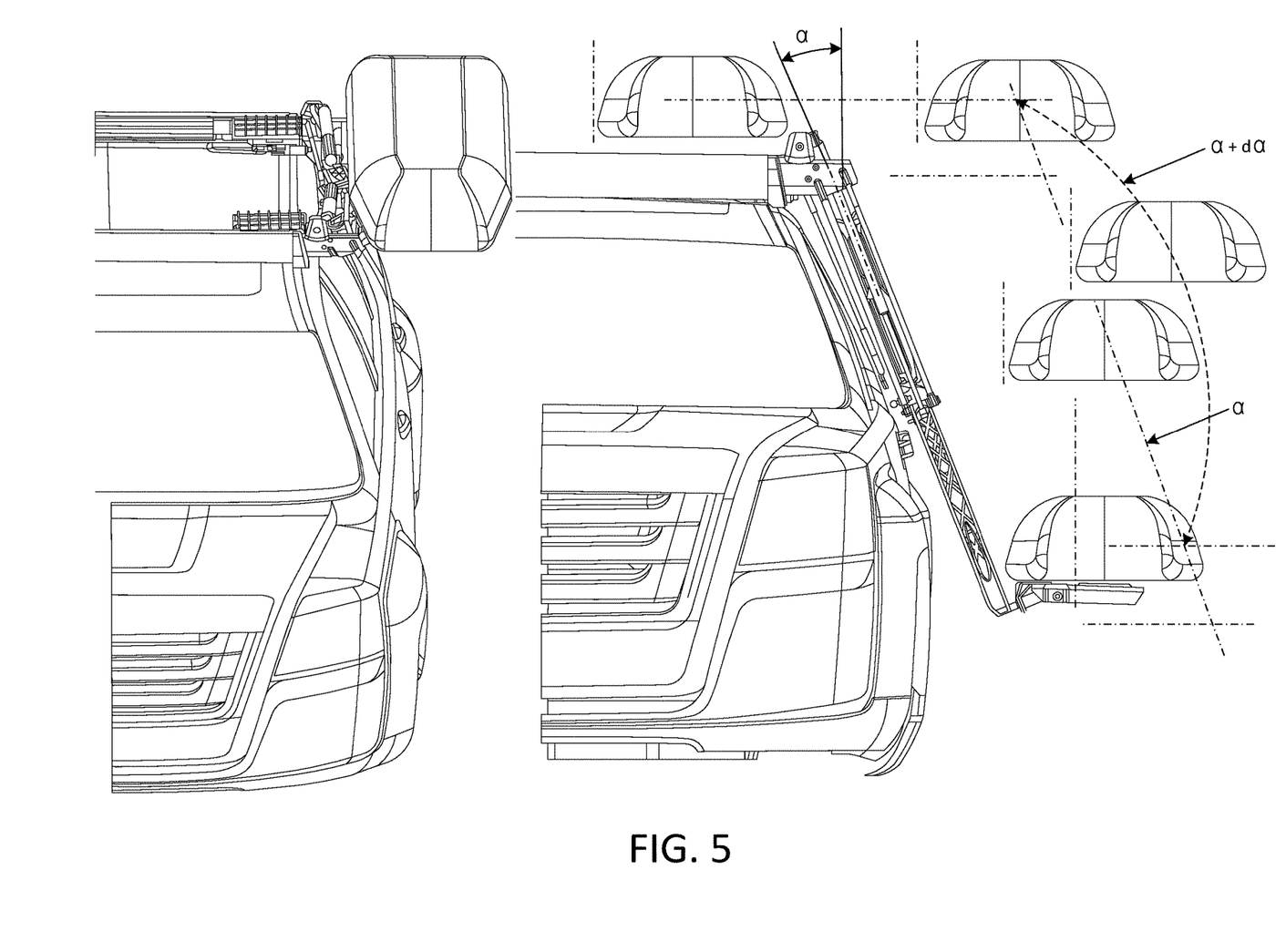
FIG. 5 shows schematic views, illustrating the powered roof system downfolding cycle and the influence of the deployment angle.

Deployment Angle (a) is best defined in a front view as the angular orientation of the primary arms relative to the extrusion guide rails (see FIG. 5). The exact value is chosen, considering safe clearance of the vehicle body throughout the downfolding cycle. In certain alternative embodiments, the clearance envelope can be increased by adding an offset (da) to the Deployment Angle ($\alpha+d\alpha$). This approach effectively increases the clearance of the cargo-platform as it deploys through a path that follows the vehicle side contour. Synchronizing the translational actuation movement concomitant with this deployment offers the additional benefit of controlling the clearance of the cargo-platform relative to the vehicle in the L configuration.

Alternative Embodiments

In alternative embodiments the cargo-platform can be easily equipped to accommodate multiple payloads and various methods to attach them. Without exhausting all the options, these include utility enclosures, bike racks, kayak racks and sport equipment confinement bags. In the case of specific payloads, such as carpets, tooling and plants, as well as other options, the sliding blocks [104(*f*) & 104(*r*)] and the elevation assemblies [200(*f*) & 200(*r*)] can be removed by disengaging the lock clip [109(*f*) & 109(*r*); see FIG. 2] and replacing with a foldable structure that slides inside the extrusion guide rails [100(*f*) & 100(*r*)] using the same guiding and locking features. A roof-wide cargo-platform could be enacted this way.

We claim:

1. A cargo carrying system for a vehicle roof, the system comprising:
    a front subsystem affixed to a front of the vehicle roof; and
    a rear subsystem affixed to a rear of the vehicle roof;
    wherein each of said front subsystem and said rear subsystem comprises an extrusion guide rail,
    wherein each extrusion guide rail slidably engaging a respective sliding block,
    wherein each respective sliding block comprises:
        a translational actuator for synchronous side-to-side movement of the respective sliding block across the vehicle roof, and
        an elevation mechanism,
    wherein the elevation mechanism comprises:
        a primary arm having a first primary end and a second primary end; and
        a secondary arm having a first secondary end and second secondary end,
    wherein said first primary end of said primary arm pivotably attaches to a corresponding sliding block,
    wherein said second primary end of said primary arm hingeably attaches to said first secondary end of said secondary arm,
    wherein said second secondary end of the secondary arm attaches to a cargo platform bracket,
    wherein said primary arm and said secondary arms are reversibly moveable between a folded position and an unfolded position,
    wherein said secondary arm is nested within said primary arm in said unfolded position, and
    wherein said secondary arm extends from said primary arm so as to raise and lower said cargo-platform bracket along a side of the vehicle.

2. The system of claim 1, wherein said primary arm is pivotable relative to said corresponding sliding block to permit the elevation mechanism to raise and lower the cargo-platform bracket without contacting a side of the vehicle.

3. The system of claim 1, wherein the elevation mechanism is further comprised of a set of gas struts so as to assist in moving the primary arm and the secondary arm between the unfolded and folded positions.

4. The system of claim 1, wherein each respective sliding block further comprises a control module in communication with a corresponding elevation mechanism so as to sequentially activate translational actuators and the corresponding elevation mechanism for moving the cargo-platform bracket between a cruising position on the vehicle roof to a loading/unloading position on the side of the vehicle.

5. The system of claim 4, wherein the control module is further comprised of an infrared (IR) sensor on the corresponding elevation mechanism so as to implement an IR digital communication channel for synchronizing the front subsystem and the rear subsystems.

\* \* \* \* \*